(12) United States Patent
Lee et al.

(10) Patent No.: US 9,019,250 B2
(45) Date of Patent: Apr. 28, 2015

(54) DISPLAY PANEL, INCLUDING A LIGHT BLOCKING MEMBER AND APERTURES DISPOSED IN A NON-DISPLAY AREA

(71) Applicant: Samsung Display Co., Ltd., Yongin (KR)

(72) Inventors: Cheol-Gon Lee, Seoul (KR); Joon-Chul Goh, Hwaseong-si (KR); Chong Chul Chai, Seoul (KR)

(73) Assignee: Samsung Display Co., Ltd., Yongin (KR)

( * ) Notice: Subject to any disclaimer, the term of this patent is extended or adjusted under 35 U.S.C. 154(b) by 156 days.

(21) Appl. No.: 13/718,592

(22) Filed: Dec. 18, 2012

(65) Prior Publication Data

US 2014/0049453 A1 Feb. 20, 2014

(30) Foreign Application Priority Data

Aug. 20, 2012 (KR) .................. 10-2012-0090649

(51) Int. Cl.
| | | |
|---|---|---|
| G09G 5/00 | (2006.01) | |
| G09G 3/20 | (2006.01) | |
| G02F 1/1335 | (2006.01) | |
| G02F 1/1362 | (2006.01) | |
| G02F 1/1333 | (2006.01) | |

(52) U.S. Cl.
CPC ............ *G09G 3/20* (2013.01); *G02F 1/133512* (2013.01); *G02F 1/136209* (2013.01); *G02F 2001/133388* (2013.01)

(58) Field of Classification Search
CPC ... G02F 1/1335; G09G 2310/0264–2310/0281
USPC ................... 345/100, 205; 313/489; 349/110; 428/40.1–42.1
See application file for complete search history.

(56) References Cited

U.S. PATENT DOCUMENTS

| | | | |
|---|---|---|---|
| 6,184,960 B1 * | 2/2001 | Sawayama et al. ........... | 349/139 |
| 7,929,287 B2 | 4/2011 | Yukawa et al. | |
| 2004/0135941 A1 * | 7/2004 | Nam et al. ..................... | 349/110 |
| 2004/0227895 A1 * | 11/2004 | Yoo et al. ...................... | 349/152 |
| 2006/0056267 A1 * | 3/2006 | Kim et al. ................. | 365/230.06 |
| 2009/0135351 A1 * | 5/2009 | Lyu et al. ...................... | 349/106 |
| 2010/0097293 A1 | 4/2010 | McMahon | |
| 2011/0242465 A1 * | 10/2011 | Lee et al. ...................... | 349/110 |
| 2012/0200820 A1 * | 8/2012 | Sato et al. ..................... | 349/153 |

FOREIGN PATENT DOCUMENTS

| | | |
|---|---|---|
| JP | 2004-069822 | 3/2004 |
| JP | 2009-237493 | 10/2009 |
| JP | 4565681 | 8/2010 |
| JP | 2010-231243 | 10/2010 |
| JP | 4674449 | 2/2011 |
| KR | 2006119134 A * | 11/2006 |
| KR | 10-0843097 | 6/2008 |
| KR | 10-2011-0033472 | 3/2011 |
| KR | 10-2011-0135288 | 12/2011 |

* cited by examiner

*Primary Examiner* — Liliana Cerullo
(74) *Attorney, Agent, or Firm* — H.C. Park & Associates, PLC

(57) ABSTRACT

A display panel includes a display area including a plurality of pixels, and a peripheral area defining a non-display area. The display area includes a first light blocking member including a plurality of first openings, and the peripheral area includes a second light blocking member including a plurality of second openings.

21 Claims, 16 Drawing Sheets

DISPLAY PANEL, INCLUDING A LIGHT BLOCKING MEMBER AND APERTURES DISPOSED IN A NON-DISPLAY AREA

CROSS-REFERENCE TO RELATED APPLICATION

This application claims priority from and the benefit of Korean Patent Application No. 10-2012-0090649, filed on Aug. 20, 2012, which is incorporated by reference for all purposes as if set forth herein.

BACKGROUND

1. Field

Exemplary embodiments relate to display technology, and more particularly, to transparent display panels.

2. Discussion

As flat panel displays have explosively occupied the consumer market, various different types of display devices have been developed. A typical flat panel display device is usually exhibits a thickness thinner than a size of a screen. Widely used flat panel displays include, for example, liquid crystal displays, organic light emitting diode displays, electrophoretic displays, electrowetting displays, plasma displays, field emission displays, and the like. Within the realm of flat panel display technology includes transparent display devices that maintain a transmitting state whether or not an image is displayed. Since the transparent display device maintains the transmitting state when not used, as well as uses ambient light in the case of the liquid crystal display, power consumption may be reduced.

In general, conventional display devices typically include a display panel including a plurality of pixels configured to display an image, a plurality of signal lines configured to transmit driving signals to one or more of the corresponding plurality of pixels, and one or more drivers configured to generate one or more driving signals configured to drive the plurality of pixels to display at least one image.

The display panel usually includes a display area configured to display the at least one image and a non-display area, which does not display the at least one image. Typically, the non-display area includes a peripheral area around the display area, e.g., surrounding (or otherwise bounding) the display area. Each of the plurality of pixels and the plurality of signal lines may be disposed in the display area. It is also noted that an end of corresponding ones of the plurality of signal lines may extend into the peripheral area.

The drivers typically include a data driver configured to apply one or more data voltages to the plurality of pixels, and a gate driver configured to apply one or more gate signals that are configured to control transmission of the data voltages. The gate driver and the data driver are usually disposed on a printed circuit board (PCB) or a flexible printed circuit film in a chip form that is connected to the display panel. Additionally or alternatively, chips corresponding to the gate and/or data drivers may be directly connected to the display panel. It is noted; however, that a structure of the gate and/or data drivers may be integrated on (or as part of) the display panel without forming the corresponding gate and/or data drivers in a separate (or dedicated) chip.

When a gate or data driver is connected to the display panel in the chip form, the plurality of signal lines in the display area extend into the peripheral area and, thereby, form a fan-out part and a pad part for connecting the chip to the display panel.

When a gate or data driver is integrated as part of the display panel, the driver may be formed in the peripheral area via one or more of the same processes utilized to form the plurality of pixels in the display area. In this manner, it is noted that in the peripheral area of the display panel where a driver or ones of the signal lines connect with the driver are positioned are typically covered (or otherwise concealed) by a light blocking member so as not to be recognized by an observer. Accordingly, in the case of a transparent display device, the peripheral area is not transparent and, thus, it is difficult to implement a display device exhibiting an entire surface that is transparent.

Therefore, there is a need for an approach that provides reliable, cost effective techniques to widen the transmitting area of a transparent display panel to, thereby, increase the amount of transparent surface area of a corresponding transparent display device.

The above information disclosed in this Background section is only for enhancement of understanding of the background of the invention and, therefore, it may contain information that does not form any part of the prior art nor what the prior art may suggest to a person of ordinary skill in the art.

SUMMARY

Exemplary embodiments provide a display panel and a display device configured to widen a transmitting area of a transparent display panel.

Additional aspects will be set forth in the detailed description which follows and, in part, will be apparent from the disclosure, or may be learned by practice of the invention.

According to exemplary embodiments, a display panel includes: a display area including a plurality of pixels, and a peripheral area defining a non-display area. The display area includes a first light blocking member including a plurality of first openings, and the peripheral area includes a second light blocking member including a plurality of second openings.

According to exemplary embodiments, a display device includes: a plurality of transmission lines, and at least one light blocking member disposed in a non-display area of the display device. The at least one light blocking member comprises a plurality of apertures, and at least some of the plurality of transmission lines are disposed between adjacent ones of the plurality of apertures.

According to exemplary embodiments, it is possible to widen a transparent area of a display panel and a display device via utilization of a perceptively transparent light blocking member disposed in a peripheral area of the display panel/display device. As such, the entire (or substantially entire) surface of the display panel can be made perceptively transparent, i.e., transparent to an observer under normal (e.g., non-magnified) viewing conditions.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate exemplary embodiments of the invention, and together with the description serve to explain the principles of the invention.

DETAILED DESCRIPTION OF THE EMBODIMENTS

Figure 1:
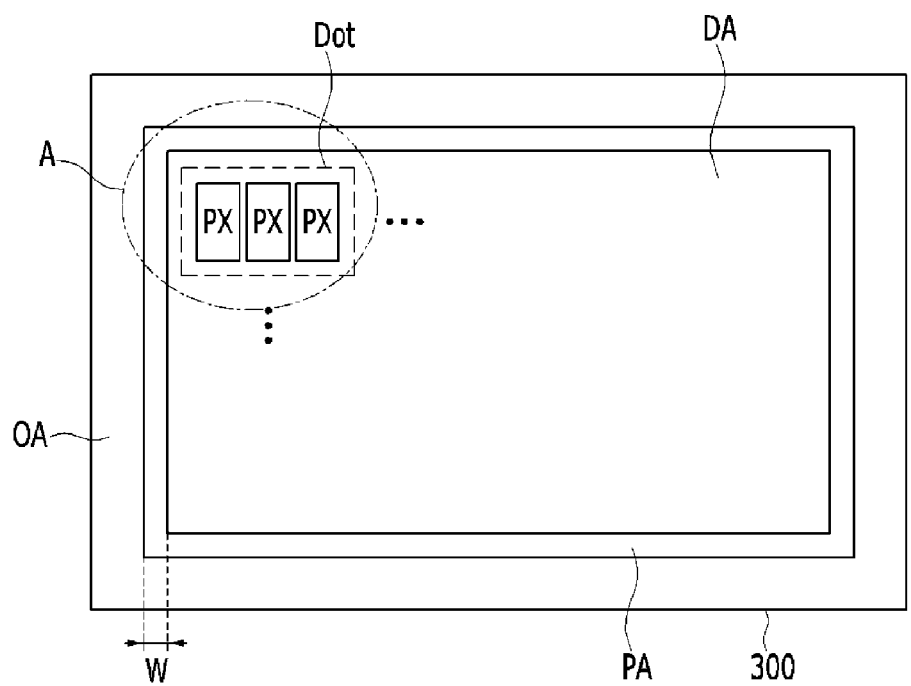
FIG. 1 is a plan view of a display panel, according to exemplary embodiments.

In the following description, for the purposes of explanation, numerous specific details are set forth in order to provide a thorough understanding of various exemplary embodiments. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments.

In the accompanying figures, the size and relative sizes of layers, films, panels, regions, etc., may be exaggerated for clarity and descriptive purposes. Also, like reference numerals denote like elements.

When an element, such as a layer, film, region, substrate, etc., is referred to as being "on," "connected to," or "coupled to" another element, it may be directly on, directly connected to, or directly coupled to the other element or intervening elements may be present. When, however, an element is referred to as being "directly on," "directly connected to," or "directly coupled to" another element, there are no intervening elements present. For the purposes of this disclosure, "at least one of X, Y, and Z" may be construed as X only, Y only, Z only, or any combination of two or more of X, Y, and Z, such as, for instance, XYZ, XYY, YZ, and ZZ. Like numbers refer to like elements throughout. As used herein, the term "and/or" is includes any and all combinations of one or more of the associated listed item.

Although the terms first, second, third, etc., may be used herein to describe various elements, components, regions, layers, and/or sections, these elements, components, regions, layers, and/or sections should not be limited by these terms. These terms are only used to distinguish one element, component, region, layer, or section from another element, component, region, layer, or section. Thus, a first element, component, region, layer, or section that is discussed below may be termed a second element, component, region, layer, or section without departing from the teachings of the present invention.

Spatially relative terms, such as "beneath," "below," "lower," "above," "upper," and/or the like, may be used herein for descriptive purposes and, thereby, to describe one element or feature's relationship to another element(s) or feature(s) as illustrated in the drawings. Spatially relative terms are intended to encompass different orientations of an apparatus in use or operation in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations) and, as such, the spatially relative descriptors used herein are to be interpreted accordingly.

The terminology used herein is for the purpose of describing particular embodiments only and is not intended to be limiting. As used herein, the singular forms "a," "an," and "the" are intended to include the plural forms as well, unless the context clearly indicates otherwise. Moreover, the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Various exemplary embodiments are described herein with reference to sectional illustrations that are schematic illustrations of idealized exemplary embodiments and/or intermediate structures. As such, variations from the shapes of the illustrations as a result, for example, of manufacturing techniques and/or tolerances, are to be expected. Thus, exemplary embodiments disclosed herein should not be construed as limited to the particular illustrated shapes of regions, but are to include deviations in shapes that result from, for instance, manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the drawings are schematic in nature and their shapes are not intended to illustrate the actual shape of a region of a device and are not intended to be limiting.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and will not be interpreted in an idealized or overly formal sense, unless expressly so defined herein.

Figure 2:
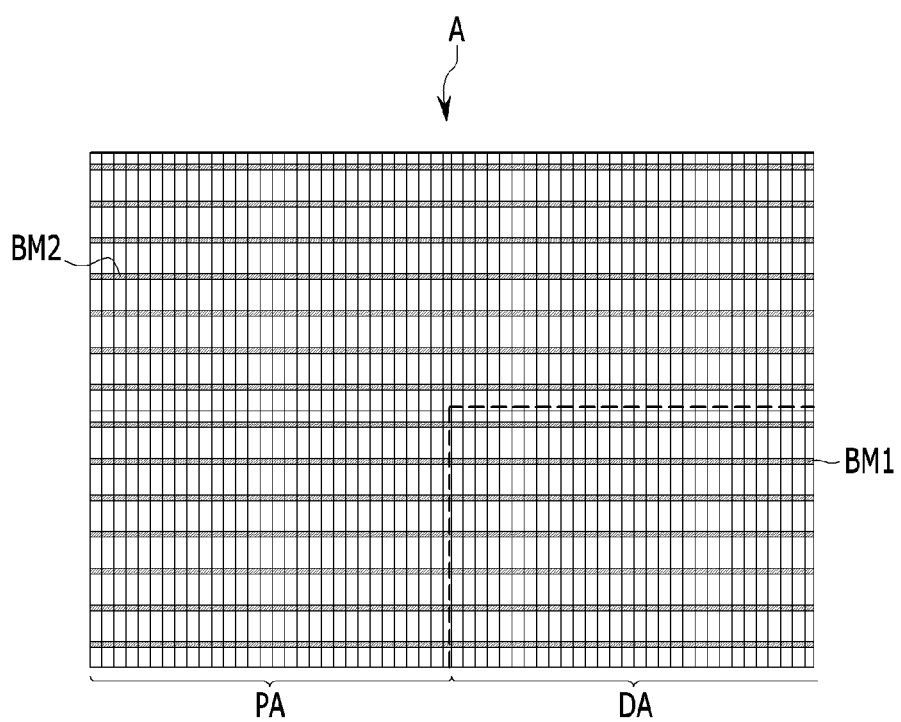
FIG. 2 is an enlarged view of a partial area of the display panel of FIG. 1, according to exemplary embodiments.
Figure 3:
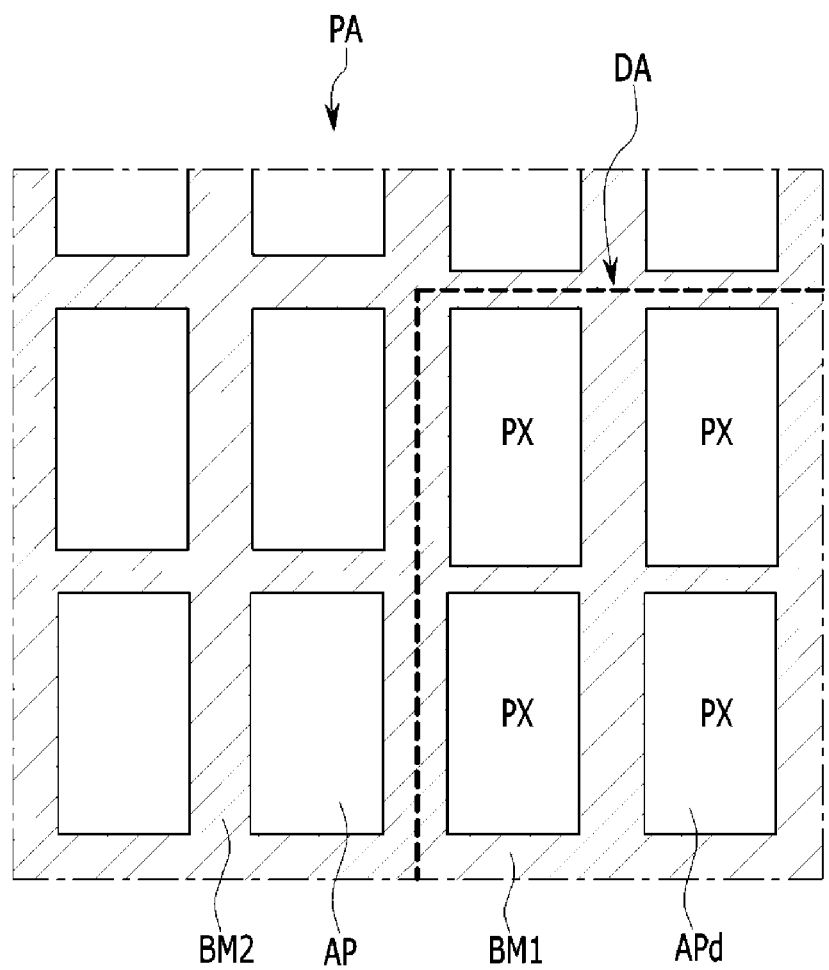
FIG. 3 is an enlarged view of a peripheral area and a display area of the display panel of FIG. 1, according to exemplary embodiments.

FIG. 1 is a plan view of a display panel, according to exemplary embodiments. FIG. 2 is an enlarged view of a partial area of the display panel of FIG. 1, whereas FIG. 3 is an is enlarged view of a peripheral area and a display area of the display panel of FIG. 1, according to exemplary embodiments.

Referring to FIG. 1, a display device includes a display panel 300. According to various exemplary embodiments, the display panel 300 may include or otherwise define any suitable flat panel display (FPD), such as, for example, a liquid crystal display (LCD), an organic light emitting diode (OLED) display, an electrophoretic display (EPD), an electrowetting display (EWD), a plasma display (PD), a field emission display (FED), and/or the like.

The display panel 300 includes a display area DA configured to display an image, and a peripheral area PA around (e.g., surrounding, bounding, etc.) the display area DA.

While not illustrated, a plurality of signal lines including, for instance, a plurality of gate lines (not shown) and a plurality of data lines (not shown), may be disposed in the display area DA. In this manner, a plurality of pixels (e.g., pixel PX) may be correspondingly connected to one or more of the plurality of signal lines. The plurality of pixels PX may be disposed in the display area DA.

According to exemplary embodiments, the gate lines are configured to transmit gate signals and extend substantially in a row direction to be parallel (or substantially parallel) to each other. The data lines are configured to transmit data voltages corresponding to image signals and extend substantially in a column direction to be parallel (or substantially parallel) to each other. In this manner, the gate lines and the data lines may be orthogonally (or substantially orthogonally) disposed with respect to one another.

The plurality of pixels PX is arranged in a matrix (or substantially matrix) form; however, it is contemplated that any suitable configuration may be utilized. Each pixel PX may include a switching element (not illustrated) connected with at least one corresponding gate line and at least one corresponding data line. At least one corresponding pixel electrode may be connected to the switching element.

In exemplary embodiments, the switching element may be a three-terminal switching element, such as a thin-film transistor (TFT) integrated into the display panel 300. The switching element may be turned on or off according to a gate signal and, thereby, selectively caused to transmit a data signal from the data line to the at least one pixel electrode. The switching element may include at least one TFT or, in other words, it is contemplated that multiple TFTs may be utilized. The pixel PX may be configured to display the corresponding image according to the data voltage applied to the at least one pixel electrode.

To implement a color display, each pixel PX may be configured to uniquely display one of a plurality of primary colors (spatial division) or each pixel PX may alternately be configured to display one or more of the plurality of primary colors within a time window (temporal division) to, thereby, achieve a desired color by a spatial and temporal sum of the one or more presented primary colors. The primary colors may include, for instance, three primary colors, such as red, green, and blue; however, it is also contemplated that any number and/or range of colors may be utilized, whether primary or not.

According to exemplary embodiments, a plurality of adjacently disposed pixels PX may be configured display different primary colors and, thereby, may be configured to form one dot Dot of the display panel 300. Although FIG. 1 shows the plurality of adjacently disposed pixels PX being adjacent to each other in a row direction, exemplary embodiments are not limited thereto. In this manner, the plurality of adjacently disposed pixels PX may be disposed adjacent to each other in a column direction, in a row direction and a column direction, in a diagonal direction, and/or the like.

Referring to FIGS. 2 and 3, a first light blocking member BM1 is disposed in the display area DA of the display panel 300. The first light blocking member BM1 may also be referred to as a black matrix. In exemplary embodiments, the first light blocking member BM1 is configured to prevent light leakage. The first light blocking member BM1 includes a plurality of display openings (or display apertures) APd, each of which define a region which transmits light of the corresponding pixel PX.

The display openings APd are regularly arranged and may be arranged in a matrix form, such as in correspondence with the arrangement of the plurality of pixels PX. A shape of the display opening APd may be a rectangle, but is not limited thereto and may have various alternative or additional shapes. Shapes of the plurality of display openings APd may be uniform; however, it is contemplated that the shapes may be non-uniform. In this manner, the plurality of display openings APd may include display openings APd of one or more different shapes and/or different patterns.

According to exemplary embodiments, at least a part of at least some of the plurality of the signal lines, such as the gate lines and the data lines, and at least some of the switching elements (or portions thereof), which are positioned in the display area DA, may be covered by the first light blocking member BM1.

The peripheral area PA may surround the display area DA or be positioned at an edge of the display panel 300. For instance, the peripheral area PA may define a boundary of the display area DA.

Drivers (not shown) configured to drive the plurality of pixels PX and a plurality of control signal lines (not shown) connected to the drivers may also be positioned in the peripheral area PA.

The drivers may include a gate driver connected to one or more of the gate lines and a data driver connected to one or more of the data lines.

In this manner, a gate driver may be configured to apply a gate signal to a gate line in accordance with a gate-on voltage Von turning on a corresponding switching element and a gate-off voltage Voff turning off the switching element.

A data driver may be configured to generate a data voltage corresponding to an image signal. In this manner, the data driver may be configured to apply the generated data voltage to the data line, such as in accordance with the operation of a corresponding switching element.

According to exemplary embodiments, the gate and/or data drivers may be integrated into the display panel 300 (together with, for instance, one or more of the switching elements, and the like) in the display area DA. As such, signal lines in the display area DA may extend to be directly connected to an output terminal of the gate or data driver.

According to exemplary embodiments, the gate and/or data drivers may be directly installed on the display panel 300 in at least one integrated circuit (IC) chip form, or may be installed on a separate printed circuit board (not shown) and, thereby, connected to the display panel 300.

As shown in FIG. 1, the display panel 300 may further include an extra area OA around the peripheral area PA. In exemplary embodiments, one or more of the data and/or gate drivers in the IC chip form or the separate printed circuit board on which one or more of the gate and/or data drivers are installed may be connected to the extra area OA. A fan-out part and a pad part used when a signal line in the display area DA extends to be connected to such gate and/or data drivers may be disposed in the peripheral area PA.

Referring to FIGS. 2 and 3, a second light blocking member BM2 is disposed in the peripheral area PA. The second light blocking member BM2 may also be referred to as a black matrix and may be configured to prevent light leakage. The second light blocking member BM2 includes a plurality of openings (or apertures) AP, each of which defines a region that transmits light.

The openings AP may be arranged in a matrix (or any other suitable) form, and may be regularly arranged by setting at least one opening AP as a first unit. At least one of an area and a shape of the opening AP may be substantially the same as or different from that of the area and shape of at least one of the display openings APd of the first light blocking member BM1 of the display area DA. For example, the shape of the opening AP may be a rectangle, but is not limited thereto and, as such, may be any suitable shape. Shapes of the plurality of opening AP may be uniform by the first unit; however, it is contemplated that the shapes may be non-uniform. In this manner, the plurality of openings AP may include openings AP of one or more different shapes and/or different patterns.

The gate and data drivers or the control signal lines connected with the gate and data drivers that are positioned in the peripheral area PA may be covered (or otherwise concealed from view) by the second light blocking member BM2.

The second light blocking member BM2 in the peripheral area PA may be disposed on the same layer as the first light blocking member BM1 in the display area DA, but is not limited thereto. As such, the second light blocking member BM2 may be disposed on a different layer than the first light blocking member BM1. The first light blocking member BM1 and the second light blocking member BM2 may be formed of the same material and/or in one or more of the same manufacturing processes, but are not limited thereto and may be formed of is different materials and/or formed in one or more different processes.

As such, when the second light blocking member BM2 in the peripheral area PA includes the plurality of openings AP, which are regularly arranged like the first light blocking member BM1 in the display area DA, the peripheral area PA may appear to be shown in an entirely (or substantially entirely) transparent state, like the display area DA, due to one or more visual psychophysics effects.

A width W of the peripheral area PA is not limited to any particular value, but may be several millimeters wide.

As previously mentioned, one or more drivers (e.g., one or more gate drivers) may be disposed in the peripheral area PA of the display panel 300, as will become more apparent below in conjunction with FIG. 4, which depicts a plan view of the display panel of FIG. 1 including a gate driver disposed in the peripheral area of the display panel, according to exemplary embodiments. In order to avoid obscuring exemplary embodiments described in association with FIG. 4, like aspects described in association with FIG. 1 are not described.

Figure 4:
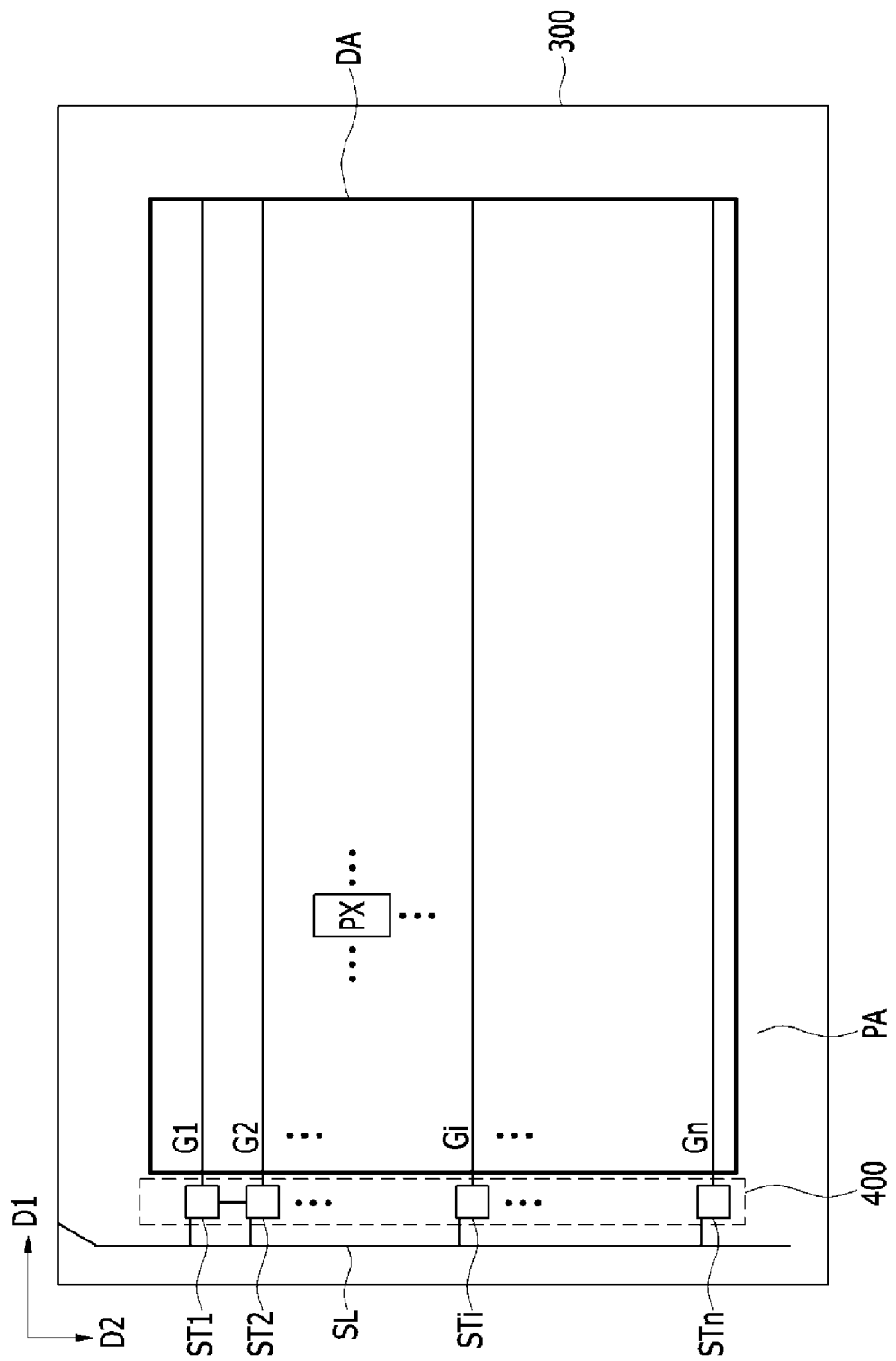
FIG. 4 is a plan view of the display panel of FIG. 1 including a gate driver disposed in the peripheral area of the display panel, according to exemplary embodiments.

As seen in FIG. 4, the display area DA of the display panel 300 includes a plurality of gate lines G1-Gn disposed therein and extending into at least a portion of the peripheral area PA. Each of the gate lines G1-Gn extend (or substantially extend) in a first direction D1, which is the row direction. In this manner, the plurality of gate lines G1-Gn may be parallel (or substantially parallel) to each other. A plurality of control signal lines SL is sequentially arranged in a second direction D2, which is the column direction, such as the control signal line SL disposed between stage ST1 and stage ST2 of gate driver 400.

According to exemplary embodiments, the peripheral area PA of the display panel 300 includes gate driver 400 connected to the plurality of gate lines G1-Gn and a plurality of control signal lines SL.

As previously mentioned, the plurality of control signal lines SL may extend in the second direction D2 in the peripheral area PA of the display panel 300 in association with the gate driver 400.

According to exemplary embodiments, the gate driver 400 includes a plurality of stages ST1-STn (where "n" is a natural number) that are subordinately connected to each other and sequentially arranged in the second direction D2. The stages ST1-STn are configured to receive control signals via the plurality of control signal lines SL, as will become more apparent below in conjunction with FIG. 5. To this end, the plurality of stages ST1-STn may be configured to generate gate signals and, thereby, configured to apply the gate signals to the gate lines G1-Gn in sequence. It is contemplated; however, that the gate signals may be applied in any other suitable fashion, such as non-sequentially, randomly, etc.

According to exemplary embodiments, each of the stages ST1-STn may be connected to at least one of an output terminal of a front (e.g., preceding, upstream, etc.) stage ST1-STn or rear (e.g., proceeding, downstream, etc.) stage ST1-STn. A first stage ST1 in which a front stage does not exist may be configured to receive a scanning start signal STV configured to indicate a start of one frame via the control signal line SL. The last stage STn in which a rear stage does not exist thereafter may be configured to receive another signal instead of being connected to the output terminal of a rear stage.

Each of the stages ST1-STn may be connected to a low voltage based on application of the gate-off voltage via the plurality of control signal lines SL. Further, each of the stages ST1-STn may be connected to another low voltage source lower than the gate-off voltage via the plurality of control signal lines SL.

Each of the stages ST1-STn may be configured to receive a clock signal via the plurality of control signal lines SL. The clock signal may include a first clock signal CLK and a second clock signal CLKB that are different from each other. Odd numbered stages (e.g., stages ST1, ST3, etc.) may be connected to the first clock signal CLK, and even numbered stages (e.g., stages ST2, ST4, etc.) may be connected to the second clock signal CLKB. A phase of the second clock signal CLKB may be opposite to a phase of the first clock signal CLK.

The gate driver 400 may be integrated into (or as part of) the peripheral area PA of the display panel 300, as previously described in association with FIGS. 1-3.

The plurality of control signal lines SL may include one or more control signal lines connected to all of the stages ST1-STn. These one or more control signal lines SL may be configured to transmit the control signals. Other control signal lines SL may be connected to one or more of the stages ST1-STn, such as one stage, two stages, etc. It is noted that ones of the control signal lines SL may be connected between stages that are separated by one or more stages, e.g., by one stage, two stages, etc. An exemplary configuration of the control signal lines SL is described in more detail in association with FIG. 5.

Figure 5:
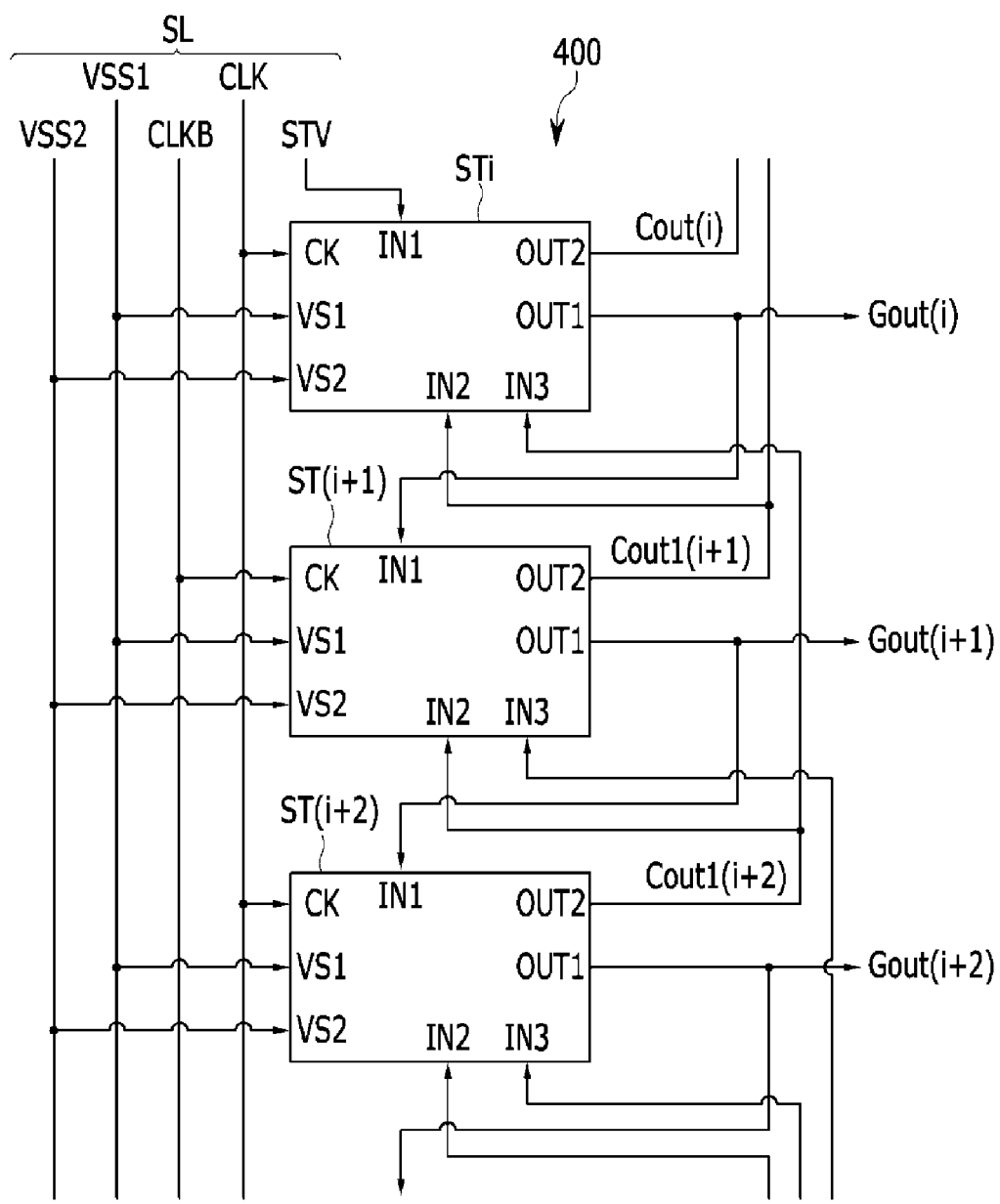
FIG. 5 is a block diagram of a gate driver, according to exemplary embodiments.

FIG. 5 is a block diagram of a gate driver, according to exemplary embodiments.

Referring to FIG. 5, the gate driver 400 may include a plurality of stages ST1, ..., STi, ST(i+1), ST(i+2), ..., STn that are subordinately connected with each other and configured to output gate signals Gout1, ..., Gout(i), Gout(i+1), Gout(i+2), ..., Gout(n) in, for example, sequence. It is noted that only stages ST(i), ST(i+1), and ST(i+2) are shown. To this end, gate driver 500 may further include a plurality of control signal lines SL configured to transmit various control signals CLK, CLKB, VSS1, VSS2, and STV to input such control signals to the stages ST1, . . . , STi, ST(i+1), ST(i+2), . . . , STn. It is further noted that ones of the plurality of is control signal lines SL may be configured to connect ones of the stages ST1, . . . , STi, ST(i+1), ST(i+2), . . . , STn to each other. For descriptive purposes, each of the control signal lines SL are collectively and/or individually referred to as a control signal line SL irrespective of the control signal (e.g., CLK, CLKB, VSS1, VSS2, and STV) that it is configured to transmit.

The plurality of control signal lines SL may include a first clock signal line CLK configured to transmit the first clock signal CLK, a second clock signal line CLKB configured to transmit the second clock signal CLKB, first and second low voltage lines VSS1 and VSS2 configured to transmit a first low voltage VSS1 and a second low voltage VSS2, respectively, a scanning start signal line STV configured to transmit the scanning start signal STV, and the like.

While not illustrated, each of the stages ST1, . . . , STi, ST(i+1), ST(i+2), . . . , STn includes a plurality of electric elements (or components), such as at least one active element, e.g., a transistor, a diode, etc., and at least one passive element, such as a capacitor.

According to exemplary embodiments, the pixel PX in the display area DA and the gate driver 400 may be formed of at least one thin film, and as such, each of the stages ST1, . . . , STi, ST(i+1), ST(i+2), . . . , STn may include a plurality of thin film transistors (TFTs). The thin film transistor may include an oxide semiconductor including a channel area; however, any suitable TFT may be utilized.

Each of the stages ST1, . . . , STi, ST(i+1), ST(i+2), . . . , STn may include a clock terminal CK connected to the plurality of thin-film transistors, a first low voltage input terminal VS1, a second low voltage input terminal VS2, a first output terminal OUT1, a second output terminal OUT2, a first signal input terminal IN1, a second signal input terminal IN2, and a third signal input terminal IN3.

One of the first clock signal CLK and the second clock signal CLKB may be is input to the clock terminal CK. For example, the first clock signal CLK may be applied to the clock terminal CK of the odd numbered stages (e.g., stages ST1, ST3, etc.), and the second clock signal CLKB may be applied to the clock terminal CK of the even numbered stages (e.g., states ST2, ST4, etc.).

The first low voltage VSS1 and the second low voltage VSS2, which are low voltages of different magnitudes) are input to the first low voltage input terminal VS1 and the second low voltage input terminal VS2, respectively. According to exemplary embodiments, the second low voltage VSS2 may be lower than the first low voltage VSS1. Values of the first low voltage VSS1 and the second low voltage VSS2 may vary; however, the absolute value may be about 5 V or less.

The first output terminal OUT1 may be configured to output the gate signals Gout1, . . . , Gout(i), Gout(i+1), Gout(i+2), . . . , Gout(n), which are correspondingly generated by each of the stages ST1, . . . , STi, ST(i+1), ST(i+2), . . . , ST(n). The second output terminal OUT2 may be configured to output the carry signals Cout1, . . . , Cout(i), Cout(i+1), Cout(i+2), . . . , Cout(n), which are correspondingly generated by each of the stages ST1, . . . , STi, ST(i+1), ST(i+2), . . . , ST(n).

The first signal input terminal IN1 may be configured to receive the gate signals Gout1, . . . , Gout(i), Gout(i+1), Gout(i+2), . . . , Gout(n-1) of an upstream stage. In the case of the first stage ST1, where an upstream stage does not exist, the scanning start signal STV may be input to the first signal input terminal IN1 thereof.

The carry signals Cout1, . . . , Cout(i), Cout(i+1), Cout(i+2), . . . , Cout(n) of downstream stages, and particularly, the carry signals Cout1, . . . , Cout(i), Cout(i+1), Cout(i+2), . . . , Cout(n) of a directly adjacent (or next) stage may be input to the second signal input terminal IN2. For instance, the second input terminal IN2 of stage ST(i+1) may be configured to receive the carry signal Cout(i+2) output from second output terminal OUT2 of stage ST(i+2).

The carry signals Cout1, . . . , Cout(i), Cout(i+1), Cout(i+2), . . . , Cout(n) of downstream stages, and particularly, the carry signals Cout1, . . . , Cout(i), Cout(i+1), Cout(i+2), . . . , Cout(n) of a stage disposed one stage away from another stage may input to the third signal input terminal IN3 of the another stage. For instance, the carry signal Cout1(i+2) output from second output terminal OUT2 of stage ST(i+2) may be input to the third signal input terminal IN3 of stage ST(i). In this manner, stage ST(i+2) is disposed one stage away from stage ST(i), i.e., stage ST(i+1) is disposed between stages ST(i) and ST(i+2).

With continued reference to FIGS. 1-5, a structure of the display panel of FIG. 1 is described in more detail in association with FIGS. 6 to 10.

Figure 6:
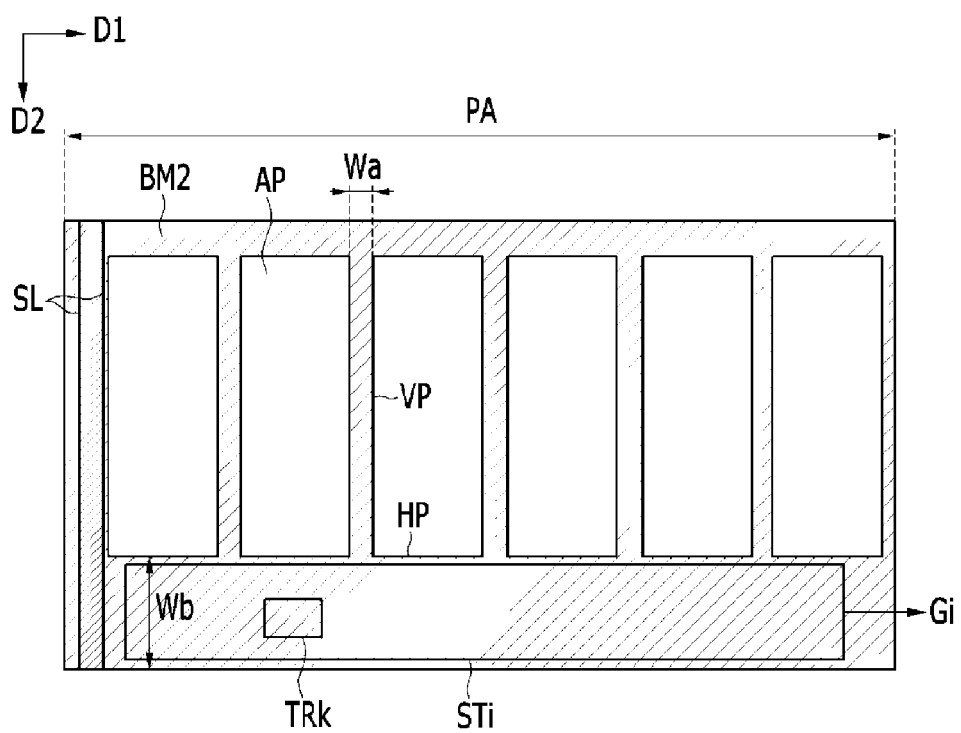
FIG. 6 is a layout view of a peripheral area of the display panel of FIG. 1, according to exemplary embodiments.
Figure 7A:
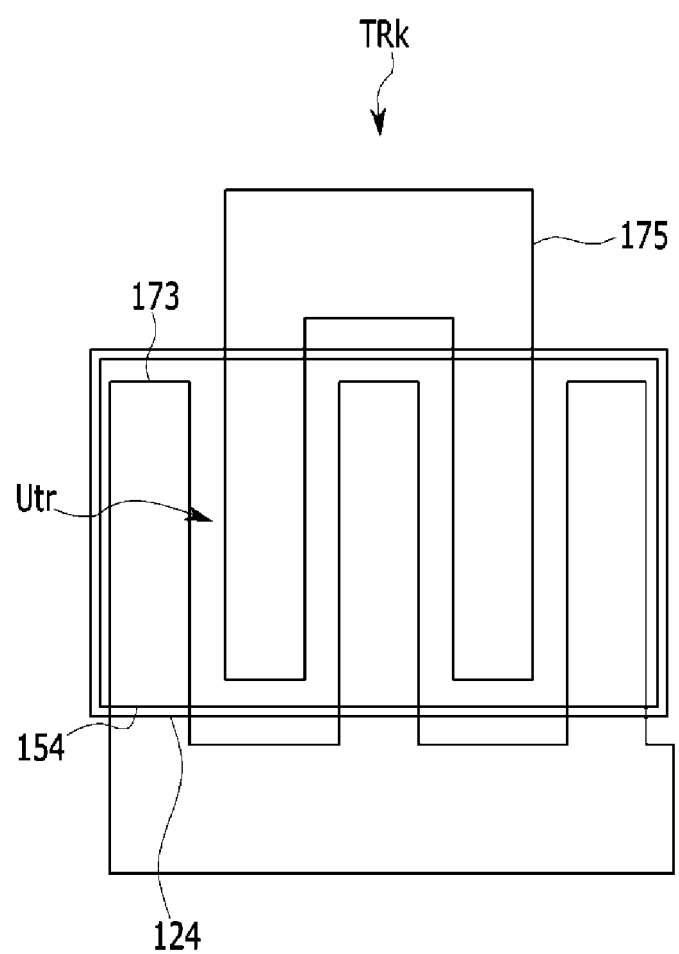
FIGS. 7A and 7B are plan views of a thin-film transistor included as part of the gate driver of the display panel of FIG. 1, according to exemplary embodiments.
Figure 7B:
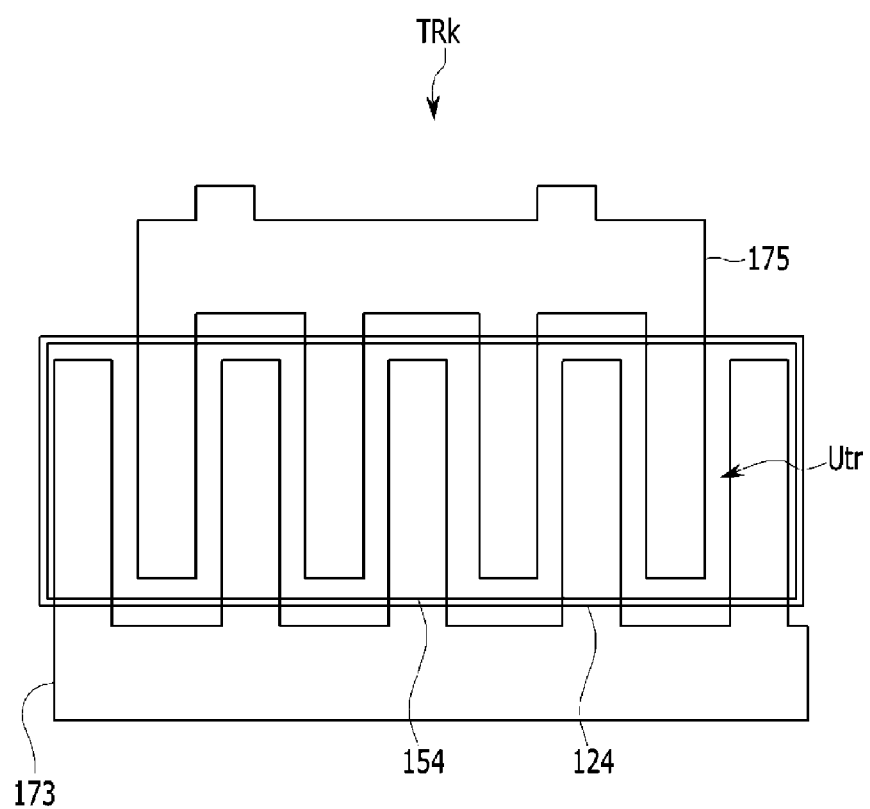
Figure 8:
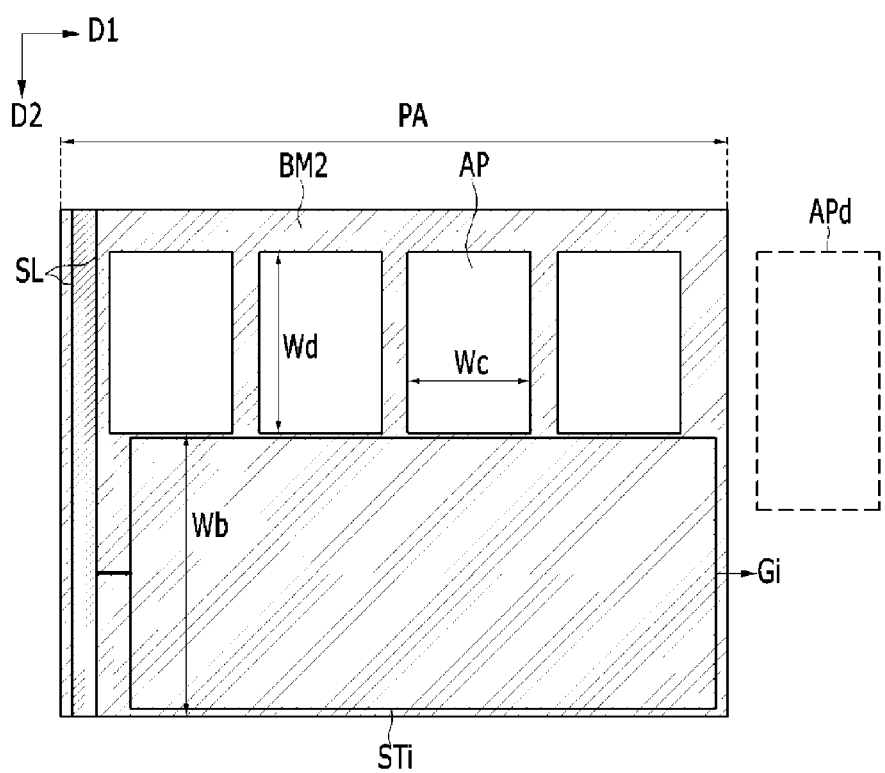
FIGS. 8-10 are layout views of a peripheral area of the display panel of FIG. 1, according to exemplary embodiments.
Figure 9:
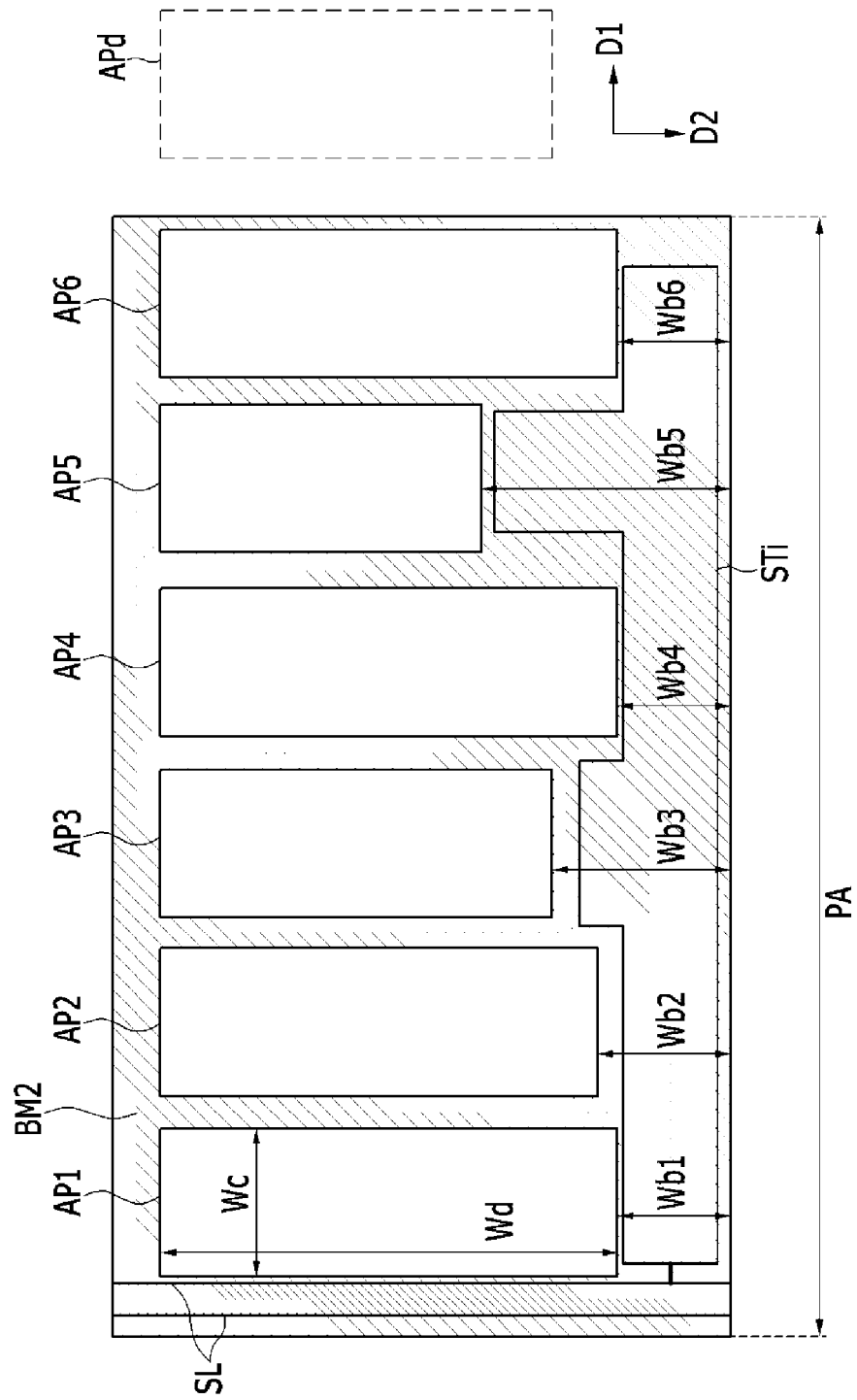
Figure 10:
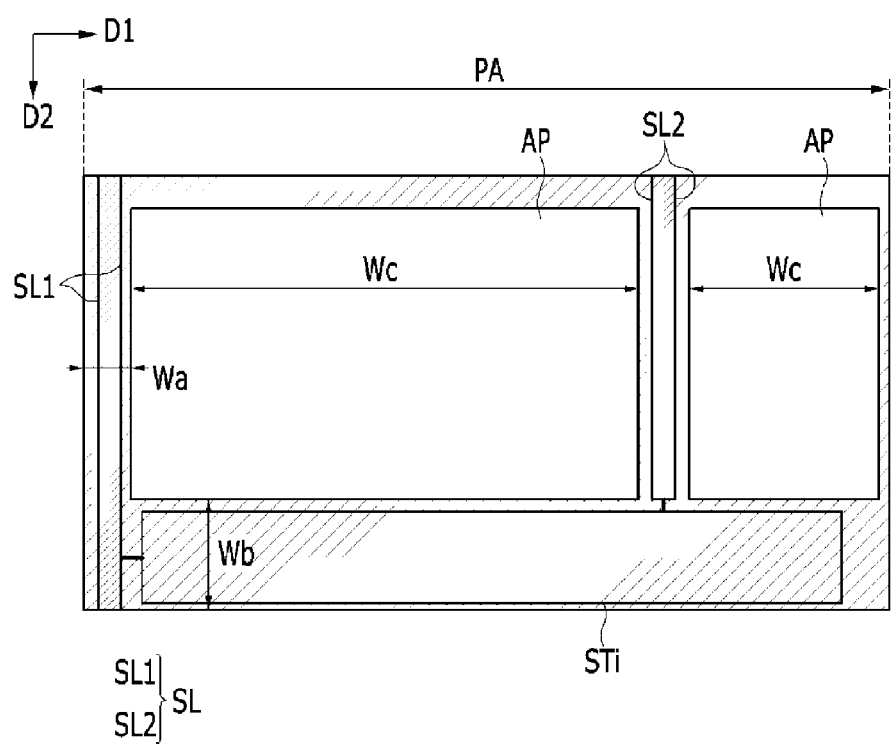

FIG. 6 is a layout view of a peripheral area of the display panel of FIG. 1, according to exemplary embodiments. FIGS. 7A and 7B are plan views of a thin-film transistor included as part of the gate driver of the display panel of FIG. 1, according to exemplary embodiments. FIGS. 8-10 are various layout views of a peripheral area of the display panel of FIG. 1, according to exemplary embodiments.

As seen in FIG. 6, the second light blocking member BM2 disposed in the peripheral area PA of the display panel 300 may include a plurality of horizontal portions HP that extend (or substantially extend) in the first direction D1, and a plurality of vertical portions VP that extend (or substantially extend) in the second direction D2. A width Wa of the vertical portion VP may be about 5 µm to about 20 µm, but is not limited thereto. Further, a width Wb of the horizontal portion HP may be several tens of but is not limited thereto. The width Wb of the horizontal portion HP may be larger than or the same as the width Wa of the vertical portion VP.

As previously mentioned, the gate driver 400 includes a plurality of stages STi (where i=1, 2, . . . , n) disposed in the peripheral area PA of the display panel 300 and correspondingly connected to the plurality of gate lines Gi. In this manner, each stage STi may be disposed in a region covered (or otherwise concealed) by the second light blocking member BM2 in the peripheral area PA, and more particularly, an area covered by the horizontal portion HP of the second light blocking member BM2.

When a stage STi includes an electric element (or component) including an opaque material, the stage STi may be disposed in the region covered (or otherwise concealed) by the second light blocking member BM2, but not disposed in an opening (or aperture) AP. Such a configuration enables the peripheral area PA to exhibit a high transparency.

When the width Wb of the horizontal portion HP of the second light blocking member BM2 is not enough to integrate the gate driver 400, a shape or a layout of a plurality of thin-film transistors included in each stage STi of the gate driver 400 may be suitably configured to enable the plurality of thin-film transistors to be concealed by the second light blocking member BM2. It is noted that FIGS. 6, 7A, and 7B only show one thin-film transistor TRk of the above-noted plurality of thin-film transistors of the stage STi for convenience and, as such, stage STi may include a plurality of thin-film transistors TRk.

Referring to FIGS. 7A and 7B, the thin-film transistor TRk included as part of the stage STi may include a source electrode 173, a drain electrode 175, a gate electrode 124, and a semiconductor 154. The source electrode 173 and the drain electrode 175 include a plurality of branches that are engaged with each other and face each other. The source electrode 173 and the drain electrode 175 are overlapped by the semiconductor 154 and the gate electrode 124.

The semiconductor 154 disposed between the branches of the source electrode 173 and the branches of the drain electrode 175 which face each other forms one channel area. Each channel area forms one unit transistor Utr together with the branches of the source electrode 173 and the branches of the drain electrode 175 which form the channel area and face each other, and the semiconductor 154 and the gate electrode 124. FIG. 7A shows an example in which the thin-film transistor TRk includes four unit transistors Utr, whereas FIG. 7B shows an example in which the thin-film transistor TRk includes eight unit transistors Utr. It is contemplated; however, that any suitable number of unit transistors may be included as part of thin-film transistor TRk. A plurality of unit transistors Utr included in one thin-film transistor TRk may perform the same function together. A channel width direction of the unit transistor Utr may extend in the second direction D2, which is shown in FIG. 6.

According to exemplary embodiments, the unit transistor Utr included in the thin film transistor TRk included in one stage STi may have the same structure as those shown in FIG. 7A. If it is difficult to form all of the stages STi in the width Wb of the horizontal portion HP of the second light blocking member BM2, the width Wb of the horizontal portion HP may be increased. However, as a result, transparency of the peripheral area PA may be lowered.

According to exemplary embodiments, in the case where it is difficult to form all of the stages STi in the width Wb of the horizontal portion HP of the second light blocking member BM2, as shown in FIG. 7B, a length of the channel width of the unit transistor Utr included in the thin film transistor TRk may be decreased. As such, the number of unit transistors Utr included in the thin film transistor TRk may be increased. Further, a region occupied by the stage STi may be enlarged in the first direction D1, and as a result, the width W of the peripheral area PA may be increased. However, since the area of the opening AP does not need to be decreased, the peripheral area PA can maintain its perception of transparency at the same level as the display area DA as described above. Further, the width W of the peripheral area PA may not be limited.

Adverting back to FIG. 6, the plurality of control signal lines SL may be disposed in the region covered (or otherwise concealed) by the second light blocking member BM2, and more particularly, the region covered by the vertical portion VP of the second light blocking member BM2.

The control signal line SL connected to all of the stages ST1-STn among the plurality of control signal lines SL may be disposed in the region of the outermost vertical portion VP in the second light blocking member BM2 as shown in FIG. 6; however, it may be alternatively disposed. Some of the plurality of control signal lines SL may be disposed in regions of different vertical portions VP. For example, the control signal line SL connecting one stage ST1-STn to another may be disposed in the region covered by the vertical portion VP positioned in the middle among the plurality of vertical portions VP of the second light blocking member BM2, whereas the control signal line SL connected to each of the stages ST1-STn may be, as previously noted, disposed in the outermost vertical portion VP.

According to exemplary embodiments, an area of the opening AP of the second light blocking member BM2 may be substantially the same as or similar to an area of the display opening APd of the first light blocking member BM1 in the display area DA.

Adverting to FIG. 8, the illustrated display panel 300 is almost the same as the display panel 300 shown in FIG. 6, however, a size of the opening AP of the second light blocking member BM2 may be decreased, as shown in FIG. 8. Also, it is noted that, in order to avoid obscuring exemplary embodiments described in association with FIG. 8, like aspects is described in association with FIGS. 1-7B are not described.

As seen in FIG. 8, the size of the opening (or aperture) AP of the second light blocking member BM2 may be smaller than the area of the display opening (or aperture) APd of the display area DA. At least one of a width We extending in the first direction D1 and a width Wd extending in the second direction D2 of the opening AP of the second light blocking member BM2 may be smaller than a width corresponding to the display opening APd of the display area DA. For example, the area of the opening AP may be about 50% or more to less than 100% of the area of the display opening APd of the display area DA.

According to exemplary embodiments, the degree of design freedom of the stage STi of the gate driver 400 disposed in the region of the second light blocking member BM2, the control signal line SL, and the signal lines, such as the gate lines G1-Gn in the peripheral area PA may be increased. Further, to ensure an area capable of forming the stage STi of the gate driver 400 in the second light blocking member BM2, the width W of the peripheral area PA need not to be increased.

Adverting FIG. 9, the illustrated display panel 300 is almost the same as the display panel 300 shown in FIG. 6, however, the area of the opening AP of the second light blocking member BM2 is not uniform and, as such, may vary according to a position within the peripheral area PA. Also, it is noted that, in order to avoid obscuring exemplary embodiments described in association with FIG. 9, like aspects described in association with FIGS. 1-8 are not described.

As seen in FIG. 9, widths Wb1, Wb2, . . . , Wb6 of the horizontal portions HP of the second light blocking member BM2 may vary according to a position within the corresponding stage STi, and as a result, the areas of the corresponding openings (or apertures) AP/1, AP2, . . . , AP6 may also vary, respectively. While FIG. 9 shows six openings AP1, AP2, . . . , AP6, it is contemplated that any suitable number of openings AP may be utilized.

According to exemplary embodiments, the openings AP1-AP6 corresponding to portions where a size of the thin-film transistor included in the stage STi is large or a large number of wires exists may be decreased, such that the width Wd of the openings extending in the second direction D2 may be configured to ensure a sufficient amount of area to include the aforementioned components of the stage STi therein. FIG. 9 shows an example in which the respective areas of some of the openings (e.g., openings AP1, AP2, AP4, and AP6) are larger than the area of the display opening APd of the display area DA.

Further, the openings AP1-AP6 corresponding to portions where the size of the thin-film transistor included in the stage STi is relatively small or a smaller number of wires exists may be increased, such that the width Wd of the openings extending in the second direction D2 may be configured to increase the light transmitting area of the peripheral area PA. For example, FIG. 9 shows an example in which the areas of some of the openings (e.g., openings AP3 and AP5) are smaller than the area of the display opening APd of the display area DA.

As seen in FIG. 9, the width Wc extending in the first direction D1 of the openings AP1-AP6 may also be controlled, such as to be uniform or non-uniform across the openings AP1-AP6.

According to exemplary embodiments, it is possible to ensure an area large enough to form the stage STi of the gate driver 400 without increasing the width W of the peripheral area PA, by suitably configuring the various portions of the second light blocking member BM2 configured to conceal one or more underlying components.

It is noted that when the size of the opening AP of the peripheral area PA is irregular without a cycle (or pattern), a boundary between the display area DA and the peripheral area PA may be recognized by an observer or a shape of the second light blocking member BM2 in the peripheral area PA may be recognized by an observer. In order to prevent such recognition, two or more openings AP may be disposed as the first unit in the openings AP of the second light blocking member BM2, such that an average area of the openings AP included in the first unit may be substantially uniform. As such, the first unit may include a same number of openings AP as the number of pixels PX included in one dot Dot of the display area DA.

As seen in FIG. 10, the illustrated display panel 300 is almost the same as the display panel 300 shown in FIG. 6, but the vertical portions VP of the second light blocking member BM2 of FIG. 10 are formed only at a place where the plurality of control signal lines SL are disposed. In this manner, the transparency of the peripheral area PA may be increased. That is, a cycle of the vertical portions VP and a cycle of the control signal lines SL may be the same as each other. Also, it is noted that, in order to avoid obscuring exemplary embodiments described in association with FIG. 10, like aspects described in association with FIGS. 1-9 are not described.

According to exemplary embodiments, the size of the opening AP of the second light blocking member BM2 may vary according to a position. Particularly, the width Wc extending in the first direction D1 of the opening AP may depend on an interval of the formed vertical portions VP. For instance, the left-most opening AP may exhibit a width Wc larger than a right-most opening AP.

Referring to FIG. 10, the plurality of control signal lines SL may include first control signal lines SL1 and second control signal lines SL2. The first control signal lines SL1 and the second signal lines SL2 may extend along regions of different vertical portions VP. A width Wa of the vertical portion VP corresponding to the first control signal line SL1 and the width Wa of the vertical portion VP corresponding to the second control signal lines SL2 may be the same as or different from the widths of the other vertical portions VP.

The first control signal lines SL1 may be disposed at the edge of the peripheral area PA, and the second control signal lines SL2 may extend between adjacent stages STi. As such, the second control signal lines SL2 may be control signal lines configured to transmit the aforementioned carry signals Cout1, . . . , Cout(i), Cout(i+1), Cout(i+2), . . . , Cout(n) of each stage STi.

Figure 11:
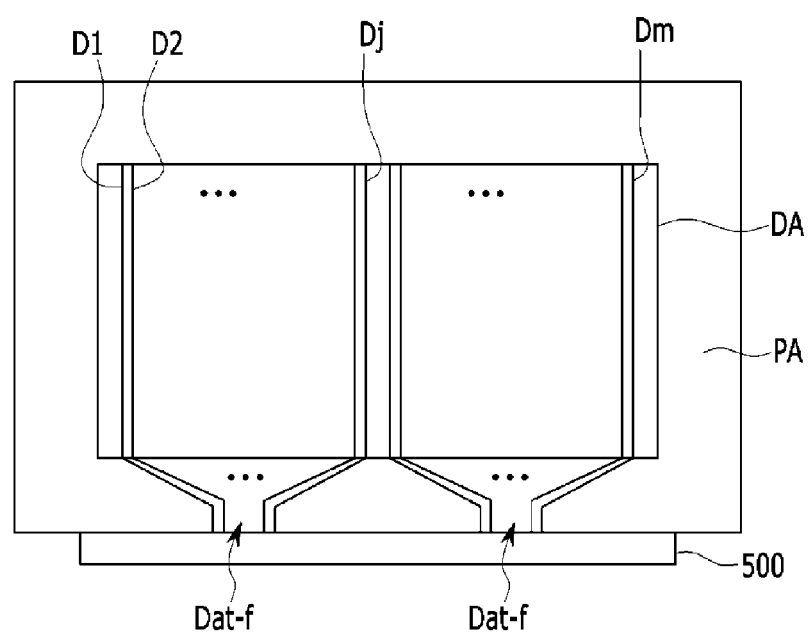
FIGS. 11 and 12 are layout views of a display panel, according to exemplary embodiments.
Figure 12:
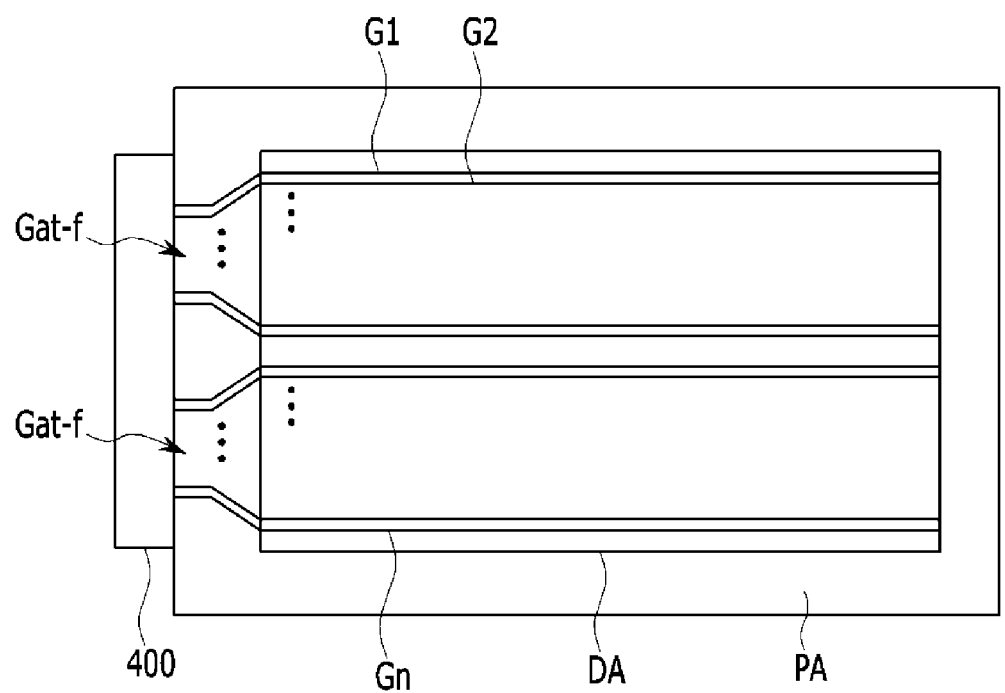

FIGS. 11 and 12 are layout views of a display panel, according to exemplary embodiments. Also, it is noted that, in order to avoid obscuring exemplary embodiments described in association with FIGS. 11 and 12, like aspects described in association with FIGS. 1-10 are not described.

As seen in FIG. 11, a plurality of data lines D1-Dm (where "m" is a real integer) is disposed in the display area DA of the display panel 300. The data lines D1-Dm may extend in a column direction. The data lines D1-Dm extend in the peripheral area PA to form one or more fan-out parts, such as fan-out parts Dat-f. An interval between the data lines D1-Dm becomes gradually smaller in the fan-out part Dat-f to form a pad part for connection to the data driver 500. In exemplary embodiments, the data driver 500 may be connected to the display panel 300 in an IC chip form or disposed on a printed circuit board or a flexible printed circuit film to be connected to the display panel 300.

The second light blocking member BM2 of the peripheral area PA includes a plurality of openings AP as described above. Since the peripheral area PA can be perceived in a is transparent state like the display area DA, when the data lines D1-Dm are disposed in the peripheral area PA and are made of opaque conductive materials, the data lines D1-Dm may be recognized by an observer. According to exemplary embodiments, however, the perception of transparency of the peripheral area PA where the data driver 500 is disposed may be maintained by forming the data lines D1-Dm of the fan-out part Dat-f disposed in the peripheral area PA of transparent conductive materials, such as aluminum zinc oxide (AZO), gallium zinc oxide (GZO), indium zinc oxide (IZO), indium tin oxide (ITO), and/or the like. To reduce resistance of the transparent conductive material forming the data lines D1-Dm of the fan-out part Dat-f, the number of data driving chips included in the data driver 500 may be increased or the data driving chips may be driven at a low frequency.

Referring to FIG. 12, features of the data lines D1-Dm and the data driver 500 of the display panel 300 described in association with FIG. 11 are applicable to the gate lines G1-Gm and the gate driver 400. As such, to avoid obscuring exemplary embodiments described in association with FIG. 12, like aspects described in association with FIGS. 1-11 are not described.

As seen in FIG. 12, a plurality of gate lines G1-Gm (where "m" is a real integer) extend in a row direction and is disposed in the display area DA of the display panel 300. The gate lines G1-Gm may extend in the peripheral area PA to form one or more fan-out parts, such as fan-out parts Gat-f. An interval between the gate lines G1-Gm becomes gradually smaller in the fan-out part Gat-f to form a pad part for connection to the gate driver 400. In exemplary embodiments, the gate driver 400 may be connected to the display panel 300 in an IC chip form or disposed on a printed circuit board or a flexible printed circuit film to be connected to the display panel 300.

The second light blocking member BM2 of the peripheral area PA includes a is plurality of openings AP as described above. Since the peripheral area PA can be perceived in a transparent state like the display area DA, when the gate lines G1-Gm are disposed in the peripheral area PA and are made of opaque conductive materials, the gate lines G1-Gm may be recognized by an observer. According to exemplary embodiments, however, the perception of transparency of the peripheral area PA where the gate driver 400 is disposed may be maintained by forming the gate lines G1-Gm of the fan-out part Gat-f disposed in the peripheral area PA of transparent conductive materials, such as AZO, GZO, IZO, ITO, and/or the like. To reduce resistance of the transparent conductive material forming the gate lines G1-Gm of the fan-out part Gat-f, the number of gate driving chips included in the gate driver 400 may be increased or the gate driving chips may be driven at a low frequency.

Figure 13:
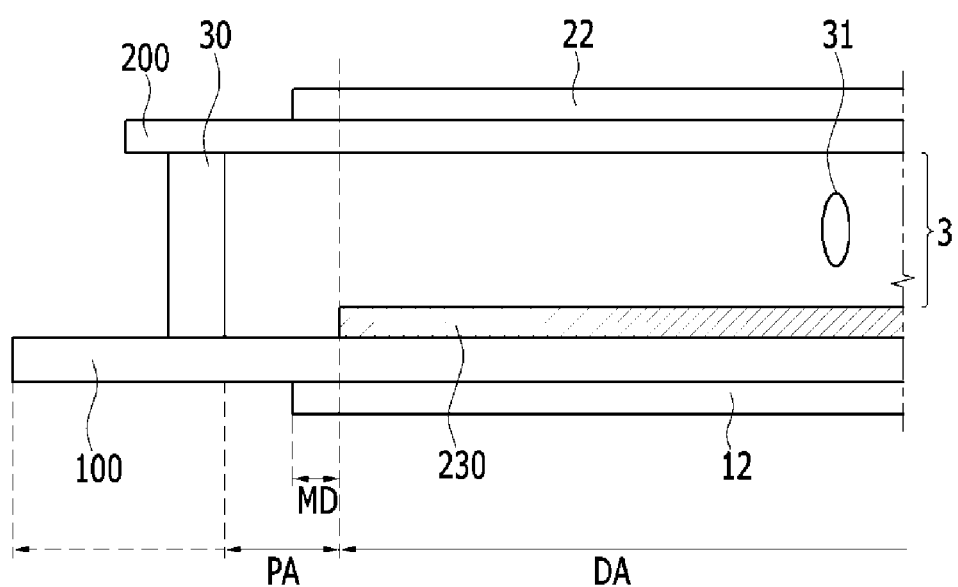
FIG. 13 is a cross-sectional view of a display panel, according to exemplary is embodiments.
Figure 14:
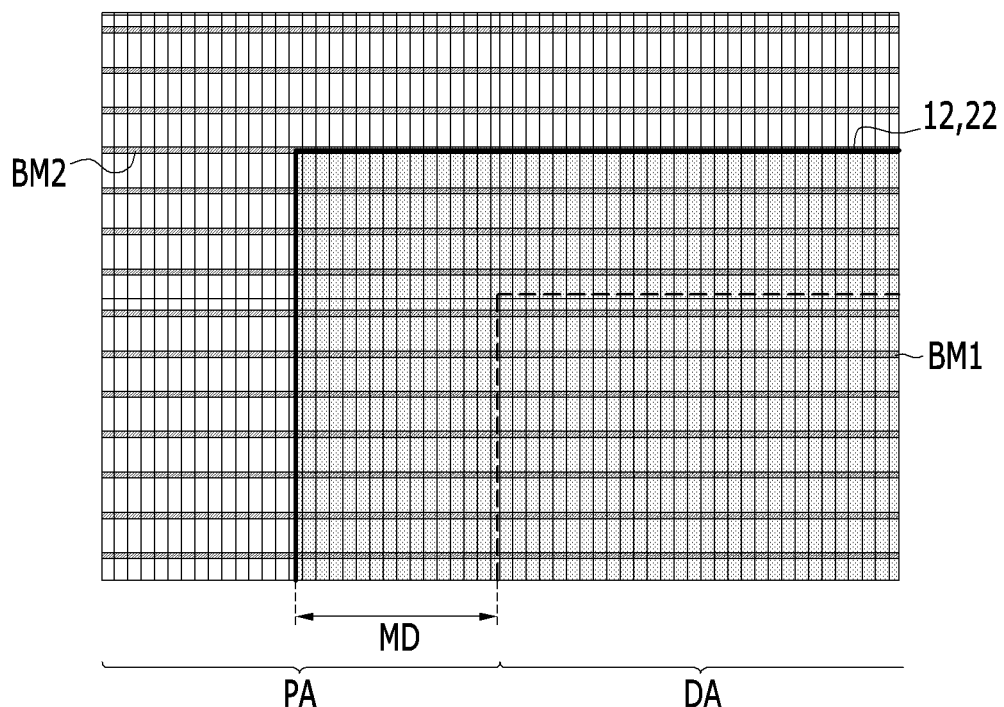
FIG. 14 is a plan view of a peripheral area and a display area of the display panel of FIG. 13, according to exemplary embodiments.

The structure of an exemplary display panel is described in more detail in association with FIGS. 13 and 14.

FIG. 13 is a cross-sectional view of a display panel, according to exemplary embodiments. FIG. 14 is a plan view of a peripheral area and a display area of the display panel of FIG. 13.

Referring to FIGS. 13 and 14, a display device may be implemented as a liquid crystal display and, thereby, may include a lower panel 100 and an upper panel 200 that face each other. A liquid crystal layer 3 may be disposed between the lower panel 100 and the upper panel 200. The display panel of FIG. 13 may have features similar to the display panel 300 of FIGS. 1-12 and, as such, to avoid obscuring exemplary embodiments described in association with FIG. 13, like aspects described in association with FIGS. 1-10 are not described.

According to exemplary embodiments, the first light blocking member BM1 or the second light blocking member BM2 may be disposed on at least one of the upper panel 200 and the lower panel 100.

A sealant 30 configured to bond the lower panel 100 and the upper panel 200 together and seal the liquid crystal layer 3, therebetween, may be disposed at an edge of the lower panel 100 and the upper panel 200. The sealant 30 may be disposed in the peripheral area PA and/or in the extra area OA shown in FIG. 1 and described above. As seen in FIG. 13, the sealant 30 is disposed outside the peripheral area PA. While the lower panel 100 and the upper panel 200 are shown extending into the peripheral area PA, it is contemplated that the peripheral area PA may only extend to an end of the lower panel 100 and/or the upper panel 200.

According to exemplary embodiments, at least one color filter 230 may be disposed on the lower panel 100 or the upper panel 200. The color filter 230 may be configured to display one of a plurality of primary colors, such as one of three primary colors, e.g., red, green, and blue. The color filter 230 may be disposed in the display area DA and may (or may not) extend in the peripheral area PA. As shown in FIG. 13, however, the color filter 230 does not extend into the peripheral area PA. Accordingly, reduction in transmittance due to the color filter 230 may be removed in the peripheral area PA.

Polarizers 12 and 22 may be disposed on the respective outer surfaces of lower panel 100 and upper panel 200. Transmissive axes of the two polarizers 12 and 22 may be perpendicular or parallel to each other, and one of the two polarizers 12 and 22 may be omitted. Liquid crystal molecules 31 of the liquid crystal layer 3 may be tilted in response to an applied electric field generated in association with the liquid crystal layer 3. In this manner, a change in the degree of polarization of incident light may be dependent on the tilted degree of the liquid crystal molecules 31. The change in the polarization is represented by the change in transmittance due to the polarizers 12 and 22, and as a result, the liquid crystal display may display an image.

In exemplary embodiments, the polarizers 12 and 22 may be disposed in the display area DA and may (or may not) be disposed in the peripheral area PA. As seed in FIG. 13, however, the polarizers 12 and 22 extend into the peripheral area PA. By considering a process margin, the polarizers 12 and 22 may be longer than the display area DA by a margin length MD. That is, a region corresponding to the margin length MD of the polarizers 12 and 22 may be disposed in the peripheral area PA, and the peripheral area PA may include a region which is not overlapped with the polarizers 12 and 22. The margin length MD may be about 3 mm or less. According to exemplary embodiments, reduction in transmittance due to the polarizers 12 and 22 may be decreased in the peripheral area PA due to the presence of the polarizers 12 and 22.

As with the case of the color filter 230, by removing the polarizers 12 and 22 from the peripheral area PA, transmittance may be increased by about 80% or more as compared to instance when one or more of the polarizers 12 and 22 extend into the peripheral area PA.

Figure 15:
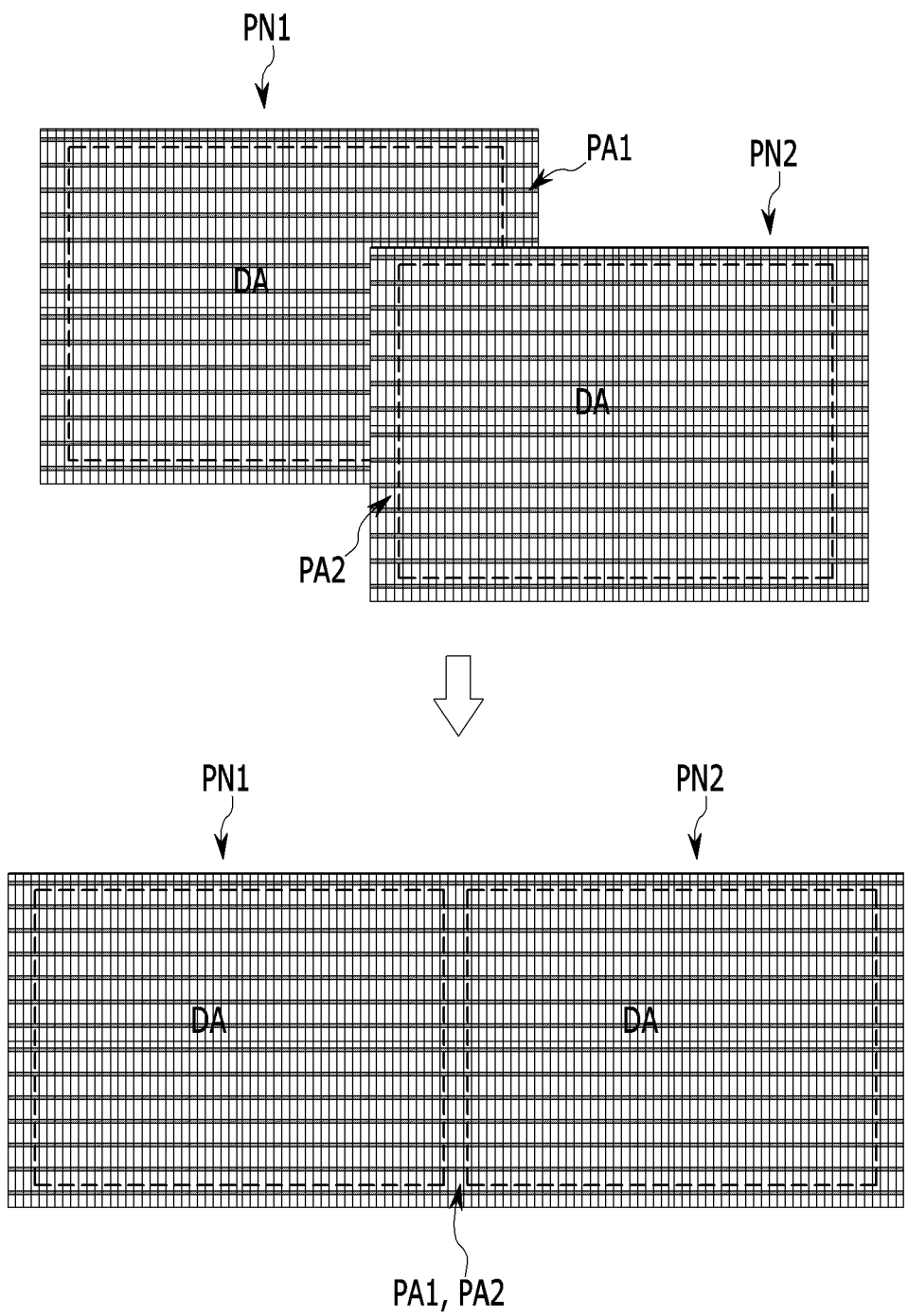
FIG. 15 is a diagram of two display panels, according to exemplary embodiments.

A method of forming a tiled display panel is described in association with FIG. 15.

FIG. 15 is a diagram illustrating two display panels, according to exemplary embodiments.

A tiled display panel includes a plurality of display panels PN1 and PN2. Each of the display panels PN1 and PN2 may be the display panel 300 described above. A first display panel PN1 includes a peripheral area PA1 around the display area DA, and a second display panel PN2 includes a peripheral area PA2 around the display area DA. The peripheral area PA1 of the first display panel PN1 and the peripheral area PA2 of the second display panel PN2 is include the second light blocking member BM2 having a plurality of openings AP as described above and may be perceptively transparent.

According to exemplary embodiments, the two display panels PN1 and PN2 may be disposed so that the respective peripheral areas PA1 and PA2 overlap with each other. As such, when the tiled display panel is formed by using the two display panels PN1 and PN2 having the transparent peripheral areas PA1 and PA2, an area of a non-display area between the two display areas DA may be decreased. Further, since the peripheral areas PA1 and PA2 are transparent, display quality of the tiled display panel may be further increased.

While certain exemplary embodiments and implementations have been described herein, other embodiments and modifications will be apparent from this description. Accordingly, the invention is not limited to such embodiments, but rather to the broader scope of the presented claims and various obvious modifications and equivalent arrangements.

What is claimed is:

1. A display panel, comprising:
   a display area comprising a plurality of pixels;
   a peripheral area defining a non-display area; and
   at least one driver disposed in the peripheral area and configured to drive the plurality of pixels,
   wherein:
     the display area comprises a first light blocking member comprising a plurality of first openings;
     the peripheral area comprises a second light blocking member comprising a plurality of second openings arranged in a matrix formation;
     the matrix formation comprises a row of second openings spaced apart from one another in a first direction and a column of second openings spaced apart from one another in a second direction;
     the second light blocking member comprises:
       a plurality of horizontal portions that extend in the first direction; and
       a plurality of vertical portions that extend in the second direction substantially perpendicular to the first direction; and
     the at least one driver is disposed inside a region covered by the horizontal portions, the driver being formed substantially outside the second openings.

2. The display panel of claim 1, wherein:
   the plurality of first openings is disposed in a matrix formation.

3. The display panel of claim 1, further comprising:
   a plurality of control signal lines,
   wherein the at least one driver is configured to receive one or more control signals via the plurality of control signal lines, and wherein the plurality of control signal lines are disposed in a region covered by one or more of the plurality of vertical portions, the control signal lines being disposed substantially outside the second openings.

4. The display panel of claim 3, wherein:
at least one of the shapes and the areas of at least two of the plurality of second openings are different from each other.

5. The display panel of claim 4, wherein:
the plurality of second openings comprise a plurality of first units;
each of the plurality of first units comprises at least two of the plurality of second openings; and
an average area of the at least two of the plurality of second openings is uniform across the plurality of first units.

6. The display panel of claim 5, wherein:
a spacing interval of the plurality of vertical portions and a spacing interval of the plurality of control signal lines are the same as each other in at least the peripheral area.

7. The display panel of claim 6, wherein:
each of the plurality of first openings comprises a substantially uniform area; and
at least one of the plurality of second openings comprises a same area as at least one of the plurality of first openings.

8. The display panel of claim 1, further comprising:
a plurality of gate lines; and
a plurality of data lines,
wherein each of the plurality of pixels are connected to corresponding ones of the plurality of gate lines and the plurality of data lines,
wherein at least one of the plurality of gate lines and the plurality of data lines comprises a fan-out part disposed in the peripheral area, and
wherein at least one of the plurality of gate lines and the plurality of data lines disposed in the fan-out part is transparent.

9. The display panel of claim 1, further comprising:
a color filter disposed in the display area and not disposed in the peripheral area.

10. The display panel of claim 1, further comprising:
a polarizer disposed in at least the display area.

11. The display panel of claim 10, wherein the polarizer extends into at least a portion of the peripheral area.

12. The display panel of claim 1, wherein:
at least one of the shapes and the areas of at least two of the plurality of second openings are different from each other.

13. The display panel of claim 12, wherein:
the plurality of second openings comprise a plurality of first units;
each of the plurality of first units comprises at least two of the plurality of second openings; and
an average area of the at least two of the plurality of second openings is uniform across the plurality of first units.

14. The display panel of claim 1, wherein:
a spacing interval of the plurality of vertical portions and a spacing interval of the plurality of control signal lines are the same as each other in at least the peripheral area.

15. A display device, comprising:
a plurality of transmission lines;
at least one light blocking member comprising a plurality of apertures disposed in a non-display area of the display device; and
a plurality of driver stages,
wherein the plurality of apertures are arranged in a matrix formation, the matrix formation comprising a row of apertures spaced apart from one another in a first direction and a column of apertures spaced apart from one another in a second direction,
wherein at least some of the plurality of transmission lines are disposed between adjacent ones of the plurality of apertures, and
wherein each of the plurality of driver stages is disposed between adjacent ones of the plurality of apertures and formed substantially outside the apertures.

16. The display device of claim 15, further comprising:
at least one light blocking member disposed in a display area of the display device, and
a second plurality of transmission lines,
wherein the at least one light blocking member disposed in the display area comprises a second plurality of apertures, and
wherein at least some of the second plurality of transmission lines are disposed between adjacent ones of the plurality of apertures and adjacent ones of the second plurality of apertures.

17. The display device according to claim 15, wherein the plurality of transmission lines are disposed between vertically adjacent ones of the plurality of apertures and the plurality of driver stages are disposed between horizontally adjacent ones of the plurality of apertures.

18. The display device according to claim 15, wherein the plurality of apertures are uniformly configured.

19. The display device according to claim 15, wherein the plurality of apertures are non-uniformly configured.

20. The display device according to claim 15, further comprising:
at least one polarizer,
wherein the at least one polarizer is disposed in a display area of the display device and not disposed in the non-display area of the display device.

21. The display device according to claim 15, wherein:
the at least one light blocking member is formed comprising an opaque material; and
the non-display area is perceptively transparent.

* * * * *